United States Patent [19]
McCorkel

[11] 3,952,862
[45] Apr. 27, 1976

[54] RIBBON FLIGHT CONVEYOR FORMED OF WELDED CHAIN LINKS

[75] Inventor: Franklin M. McCorkel, Leola, Pa.

[73] Assignee: Aggregates Equipment, Inc., Leola, Pa.

[22] Filed: July 16, 1975

[21] Appl. No.: 596,214

[52] U.S. Cl................................ 198/213; 198/64; 259/97
[51] Int. Cl.²......................................... B65G 33/26
[58] Field of Search..................... 198/64, 213–217; 59/31; 239/218.5; 37/81, 82; 115/34 R, 63; 259/25, 45, 97

[56] References Cited
UNITED STATES PATENTS

| | | |
|---|---|---|
| 1,662,832 | 3/1928 | Nelson et al................. 198/213 UX |
| 2,585,124 | 2/1952 | Hill................................. 198/213 X |
| 3,191,762 | 6/1965 | Brietzke............................. 198/213 |
| 3,580,384 | 5/1971 | Pingree........................... 198/214 X |
| 3,802,551 | 4/1974 | Somers.............................. 198/213 |

Primary Examiner—Evon C. Blunk
Assistant Examiner—Richard K. Thomson
Attorney, Agent, or Firm—John C. Thompson

[57] ABSTRACT

A ribbon flight conveyor in which the auger flighting is formed of a chain in which adjacent links have been welded to each other to form a rigid auger flighting.

5 Claims, 4 Drawing Figures

U.S. Patent   April 27, 1976   3,952,862
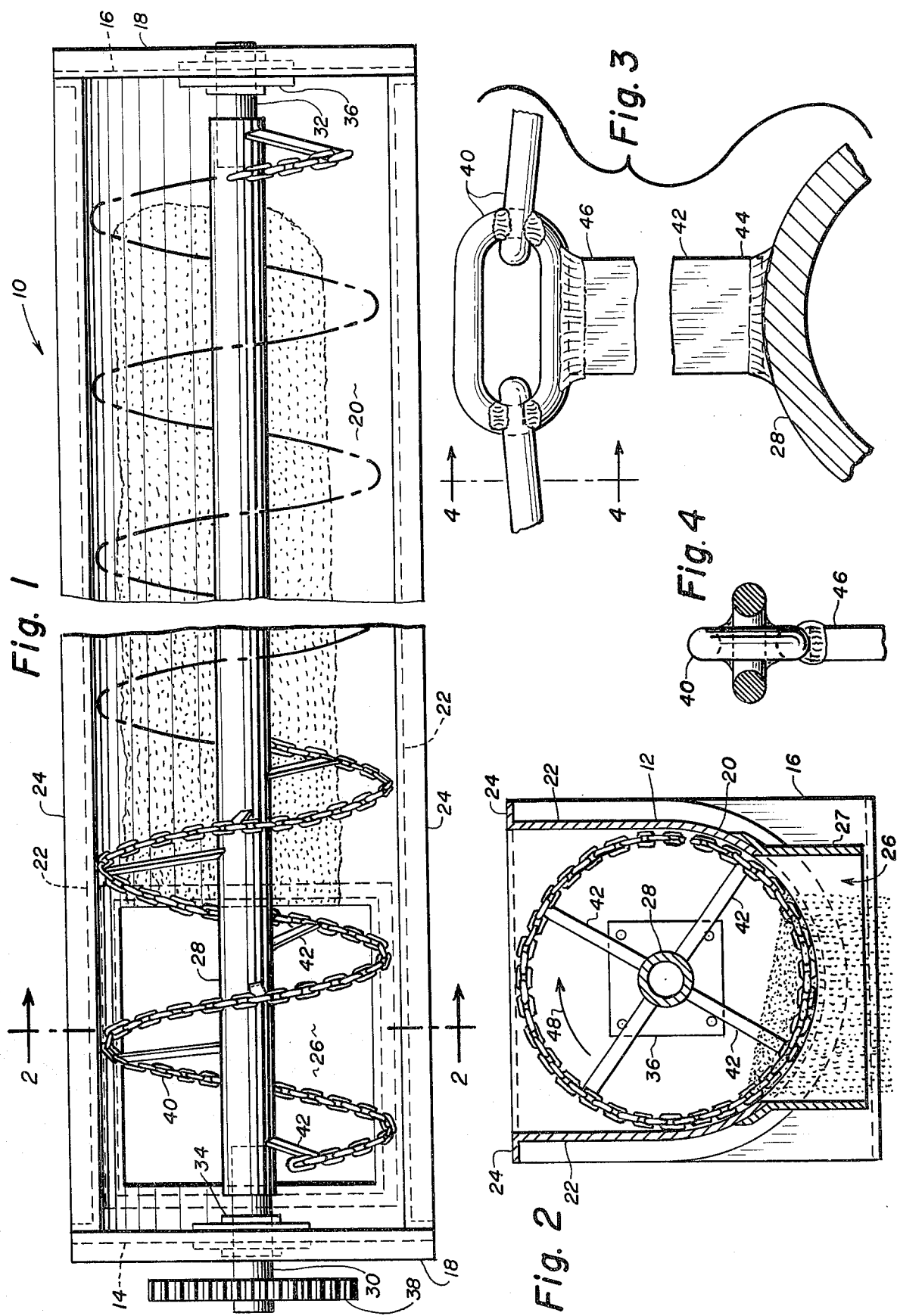

RIBBON FLIGHT CONVEYOR FORMED OF WELDED CHAIN LINKS

FIELD OF THE INVENTION

The present invention relates generally to material handling equipment and more particularly to a conveyor of the type generally known as a ribbon flight auger conveyor.

BACKGROUND OF THE INVENTION

One of the most common forms of material handling equipment is an auger flight conveyor. In an auger flight conveyor a spiral member is customarally interconnected with a centrally located mounting tube which is mounted for rotation within a trough or a cylindrical tube. The inner edge of the auger flighting may either be disposed immediately adjacent the surface of the mounting tube or be spaced away from the surface of the mounting tube, and if the inner edge of the flighting is spaced away from the mounting tube it is generally referred to as a ribbon flight conveyor. In the prior art the flighting, whether ribbon flight or flighting which has the inner edge disposed immediately adjacent the mounting tube, has been formed of either sheet metal, or in ribbon flight conveyors of spiral rods. If the flighting is made of sheet metal it can be formed by running sheet metal through a flight forming machine which distorts the sheet metal from a generally elongated rectangular shape into a spiral shape. Alternatively, the sheet metal flighting may be formed by cutting out sheet metal discs, forming a radial cut in the discs, and pulling the adjacent edges away from each other to the desired pitch and then mounting the discs upon the mounting shaft. In the first of these situations expensive machinery is required and many manufacturers o machinery which utilize auger conveyors do not have a sufficient conveyor volume to justify the cost of such machinery and therefore are compelled to order augur flighting from specialty manufacturers, such orders frequently not being filled for long periods of time.

Ribbon flighting formed of single spiral rod, such as the type shown in U.S. Pat. No. 2,742,139 issued Apr. 17, 1956 to M.L. Smallegan, also generally require a special machine for forming the rod into a spiral shape. Again, many small manufacturers cannot justify the cost of such machinery and are required to purchase the flighting from specialty manufacturers.

In the past it has been proposed to make ribbon flighting from a plurality of rod-like elements which are interconnected to each other, one such example being shown in U.S. Pat. No. 1,515,552 issued Nov. 11, 1924 to E. Cravens. Such a design, however, also requires machinery to form the rods into segments of a spiral and it is not practical to advantageously utilize the principles shown in this patent for forming ribbon flight conveyors of differing pitches and diameters.

OBJECTS AND SUMMARY OF THE INVENTION

It is a principle of the present invention to provide a method whereby ribbon flighting for conveyors can be advantageously manufactured to differing diameters and pitches without the necessity of specialized equipment.

It is a further object of the present invention to provied a method of making ribbon flighting for conveyors wherein a length of chain is spirally wound upon a generally cylindrical form, adjacent links of the chain being rigidly interconnected to each other to form a rigid spiral, the rigid spiral being subsequently interconnected to a mounting shaft by a plurality of support straps to form ribbon flighting for a conveyor.

It is another object of the present invention to provide ribbon flighting for conveyors in which the flighting includes a chain in which adjacent links are welded to each other to form the chain into a rigid spiral.

The foregoing objects are realized by providing a length of chain, wrapping the chain about a generally cylindrical form having a diameter equal to the diameter of the ribbon flighting of the conveyor less two times the thickness (or width) of the chain, the chain being wrapped initially to its desired pitch, by subsequently welding adjacent links of a chain to each other to form a rigid spiral, by then removing the form, next by disposing the rigid spiral about a mounting tube with the axis of the rigid spiral and the mounting tube being concentric with each other, and finally by interconnecting the rigid spiral to the mounting tube by interposing support straps between the tube and the rigid spiral and securing the support straps to the tube and the rigid spiral by welding and the like.

The foregoing objects and other objects and advantages of this invention will be apparent to those skilled in the art after a consideration of the following detailed description taken in conjunction with the accompanying drawings in which a preferred form of this invention is illustrated.

BRIEF DESCRIPTION OF THE DRAWINGS

FIG. 1 is a plan view of a conveyor embodying the principles of this invention, a portion of the conveyor being broken out.

FIG. 2 is a section taken generally along the lines 2—2 in FIG. 1.

FIG. 3 is an enlarged fragmentary view of a portion of the conveyor shown in FIG. 2.

FIG. 4 is a section taken generally along the lines 4—4 in FIG. 3.

DETAILED DESCRIPTION OF A PREFERRED EMBODIMENT

Referring first to FIG. 1, a conveyor is shown, the conveyor being indicated generally at 10. The conveyor consists essentially of a trough 12, the trough extending between two end plates 14, 16. Each of the end plates is of generally rectangular configuration as can best be seen from FIG. 2, each end plate having an upper outwardly extending flange portion 18. The trough has a generally cylindrical bottom portion 20, opposed parallel sides 22 which extend upwardly from the bottom portion 20, the parallel sides terminating in outwardly extending flanges 24. One end of the trough is provided with a discharge opening 26, the discharge opening 26 being surrounded by a discharge duct 27, the upper end of which conforms to the adjacent edges of the trough and which is secured thereto.

A mounting shaft 28 is rotatably journalled within the through with its axis concentric with the axis of the cylindrical bottom portion 20 of the trough 12. As can be seen from FIG. 1 the mounting shaft 28 is a hollow tubular member the ends of which are mounted on stub shafts 30, 32. The stub shafts are journalled in bearing blocks 34, 36 which are in turn supported by the end plates 14, 16 in a conventional manner. A gear 38, or other similar member which is adapted to be driven, is mounted on one end of the stub shaft 30 outside of the trough 12 and is adapted to be drive in any conventional manner. If the gear 38 is rotated, the mounting shaft 28 will also be caused to be rotated.

A rigid spiral 40, which is formed of a length of chain whose links are welded together in a manner which will be more fully set forth below is disposed concentrically about the mounting shaft 28. A plurality of mounting straps 42 are spirally disposed about the shaft 28, the inner ends of the mounting straps being secured to the mounting shaft 28 by welding, and the outer end 46 of the mounting straps being secured to the rigid spiral 40 also by welding or the like.

It can be appreciated that if the ribbon flighting, formed of the mounting shaft and the rigid spiral secured to the mounting shaft by the support straps, is rotated in the direction indicated by the arrow 48 that material disposed within the auger trough 12 will be conveyed from the right side of FIG. 1 to the left side of FIG. 1 to cause the material to be discharged through the opening 26.

It has been found that the foregoing conveyor is suitable for conveying virtually any material which can be conveyed by existing ribbon flight conveyors having the flighting formed of sheet metal. Furthermore, such a conveyor can be easily made up in virtually any welding shop by merely wrapping a chain about a generally cylindrical form and welding adjacent links to each other to form a rigid spiral which can then be secured to a mounting tube by support straps.

The manner of making the chain concists essentially of providing a generally cylindrical form (not illustrated) having a diameter equal to the desired diameter of the finished ribbon flighting less two times the thickness of the chain. The thickness of the chain is the outside width of each of the elongated links. The chain which is to be wrapped about the generally cylindrical form is of a type generally referred to in the trade as proof coil chain having straight links. After a form of the proper diameter has been selected, one end of the chain is secured to one end of the form and the chain is then spirally wrapped around the form to the desired pitch. While various types of generally cylindrical forms may be used, in practice sheet metal cylindrical ductwork has been found to be suitable. After the chain has been wrapped around the form adjacent links are secured to each other by welding. First, however, it is desirable to insure that all of the links are disposed at right angles to each other in the position best illustrated in FIG. 4. In this position every other link will be disposed in a position where it lies in a plane normal to the axis of the generally cylindrical form. Adjacent links are then secured to each other by welding, there being at least two welds at each end of a link. Where the ribbon flighting is to be used in a general light purpose application two welds should be sufficient, however, if the application is to be for heavy duty use additional welds should be made, such as the four welds shown in FIG. 4. After the links of the chain have been welded together in the aforesaid manner to provide for the desired rigid spiral, the form is then removed from the inside of the rigid spiral. The rigid spiral is now disposed about the mounting shaft in such a manner that the axis of the rigid spiral is concentric with the axis of the shaft. A plurality of mounting straps are then employed to interconnect the rigid spiral to the mounting shaft, the straps being of a length slightly less than the distance between the outer surface of the mounting shaft and the inner surface of the rigid spiral. The support straps are welded into position in the manner best illustrated in FIG. 3.

While the foregoing invention has been described with respect to a welded proof coil chain having straight links it should be appreciated that other forms of chains may be advantageously used in the practice of this invention. For example machine chain may be employed, or chain having twisted links. Other forms of chain will be apparent to those having ordinary skill in the art. Therefore, it is to be understood that while the preferred structure in which the principles of the present invention have been incorporated is shown and described above, the invention is not to be limited to the particular details, shown and described above, but that, in fact, widely differing means may be employed in the practice of the broader aspects of the invention.

What is claimed is:

1. A method of making ribbon flighting for a conveyor comprising the steps of:
providing a length of chain having a plurality of interconnected links;
selecting a generally cylindrical form having a diameter equal to the desired final diameter of the ribbon flighting less 2 times the thickness of the chain:
wrapping the chain about the generally cylindrical form to the desired pitch;
welding adjacent links of the chain to each other throughout the length of the chain to form a rigid spiral formed of welded chain links:
removing the generally cylindrical form;
disposing a mounting shaft concentrically within the rigid spiral; and
welding one end of each of a plurality of support straps to the rigid spiral and the other end of each of said support straps to the mounting shaft to form ribbon flighting for a conveyor.

2. The method set forth in claim 1 wherein adjacent links are welded to each other by disposing alternate links in a plane normal to the axis of the generally cylindrical form and disposing intermediate links at right angles to said alternate links, and welding said intermediate links to said alternate links.

3. The method set forth in claim 2 wherein the support straps are welded to said alternate links.

4. Ribbon flighting for a conveyor comprising:
a mounting shaft:
a rigid spiral formed of a length of chain having adjacent links welded to each other, said rigid spiral being disposed concentrically about said mounting shaft; and
a plurality of support straps interconnecting said rigid spiral to said mounting shaft.

5. A ribbon flight conveyor comprising:
a trough having a generally cylindrical bottom portion;
mounting shaft means;
means operable to journal the mounting shaft means for rotation with the axis of the mounting shaft means being generally concentric with the axis of said trough;
a rigid spiral formed of a plurality of chain links which have been rigidly interconnected to each other; and
a plurality of mounting straps interconnecting the rigid spiral to said mounting shaft.

* * * * *